US007075063B2

(12) United States Patent
Dong et al.

(10) Patent No.: US 7,075,063 B2
(45) Date of Patent: Jul. 11, 2006

(54) DETERMINING PHASE TRANSITION PRESSURE OF DOWNHOLE RETROGRADE CONDENSATE

(75) Inventors: Chengli Dong, Pearland, TX (US); Soraya S. Betancourt, Ridgefield, CT (US); Go Fujisawa, Danbury, CT (US); Oliver C. Mullins, Ridgefield, CT (US); James J. Dunlap, Sugar Land, TX (US)

(73) Assignee: Schlumberger Technology Corporation, Ridgefield, CT (US)

( * ) Notice: Subject to any disclaimer, the term of this patent is extended or adjusted under 35 U.S.C. 154(b) by 356 days.

(21) Appl. No.: 10/670,615

(22) Filed: Sep. 25, 2003

(65) Prior Publication Data

US 2005/0067562 A1    Mar. 31, 2005

Related U.S. Application Data

(63) Continuation-in-part of application No. 10/309,850, filed on Dec. 3, 2002.

(60) Provisional application No. 60/391,570, filed on Jun. 26, 2002.

(51) Int. Cl.
G01V 8/00 (2006.01)
(52) U.S. Cl. .................... 250/269.1; 250/258
(58) Field of Classification Search ............. 250/269.1, 250/258, 256
See application file for complete search history.

(56) References Cited

U.S. PATENT DOCUMENTS

| 3,780,575 A | 12/1973 | Urbanosky | 73/152 |
|---|---|---|---|
| 3,859,851 A | 1/1975 | Urbanosky | 73/155 |
| 4,860,581 A | 8/1989 | Zimmerman et al. | 73/155 |
| 4,994,671 A | 2/1991 | Safinya et al. | 250/255 |
| 5,167,149 A | 12/1992 | Mullins et al. | 73/155 |
| 5,656,810 A * | 8/1997 | Alfano et al. | 250/301 |
| 5,691,809 A | 11/1997 | Tackett et al. | 356/72 |
| 5,939,717 A | 8/1999 | Mullins | 250/255 |

(Continued)

FOREIGN PATENT DOCUMENTS

EP    0 461 321 A1    12/1991

(Continued)

OTHER PUBLICATIONS

Downare, T. D. et al. "Visible and Near-Infrared Fluorescence of Crude Oils". *Applied Spectroscopy*, vol. 49, No. 6, (1995), pp. 754-764.

(Continued)

*Primary Examiner*—Albert Gagliardi
(74) *Attorney, Agent, or Firm*—John L. Lee; Jody Lynn DeStefanis; William L. Wang

(57) ABSTRACT

The invention provides a method for determining phase transition pressure of downhole retrograde condensate. An OBM-contamination value is produced from a time-series of fluorescence values produced by measuring fluorescence emitted from a single-phase flow of OBM-contaminated formation fluid in a downhole cell during a cycle of time. The pressure of fluid in the cell is set at a transition boundary by incrementing drawdown pressure and monitoring the presence or absence of a phase transition. An apparent phase transition pressure value associated with the cycle of time is produced by setting apparent phase transition pressure value equal to cell pressure. This process is repeated for several cycles of time to produce a number of pairs of OBM-contamination value and apparent phase transition pressure value as OBM-contamination decreases over time. The value of phase transition pressure is determined by extrapolating from a representation of apparent phase transition pressure values versus OBM-contamination values.

34 Claims, 16 Drawing Sheets

U.S. PATENT DOCUMENTS

| | | | |
|---|---|---|---|
| 6,274,865 B1 | 8/2001 | Schroer et al. | 250/269.1 |
| 6,350,986 B1 | 2/2002 | Mullins et al. | 250/269.1 |
| 2002/0139929 A1* | 10/2002 | Mullins et al. | 250/255 |
| 2003/0193662 A1* | 10/2003 | DiFoggio et al. | 356/128 |
| 2004/0000400 A1* | 1/2004 | Fujisawa et al. | 166/250.01 |
| 2004/0000636 A1* | 1/2004 | Mullins et al. | 250/269.1 |

FOREIGN PATENT DOCUMENTS

| | | |
|---|---|---|
| EP | 1 203 942 A1 | 5/2002 |
| WO | WO 01/20322 A1 | 3/2001 |
| WO | WO02/066964 A2 | 8/2002 |
| WO | WO02/066964 A3 | 8/2002 |

OTHER PUBLICATIONS

Mullins, O. C. et al. "Downhole Determination of GOR on Single-Phase Fluids by Optical Spectroscopy". *SPWLA 42nd Annual Symposium*, Paper M, (2001), pp. 1-14.

Ralston, C. Y. et al. "Quantum Yields of Crude Oils". *Applied Spectroscopy*, vol. 50, No. 12, (1996), pp. 1563-1568.

Wang, X. et al. "Fluorescence Lifetime Studies of Crude Oils". *Applied Spectroscopy*, vol. 48, No. 8, (1994), pp. 977-984.

\* cited by examiner

DETERMINING PHASE TRANSITION PRESSURE OF DOWNHOLE RETROGRADE CONDENSATE

This application is a continuation-in-part of and claims priority to co-owned, U.S. application Ser. No. 10/309,850, filed 3 Dec. 2002, which application claimed priority to co-owned, U.S. provisional application No. 60/391,570, filed 26 Jun. 2002 (now abandoned).

FIELD OF THE INVENTION

The invention is intended for use in the petroleum industry, or in any industry requiring the characterization of fluids in a fluid reservoir residing downhole in an earth formation surrounding a borehole.

BACKGROUND OF THE INVENTION

In investigative logging, the ability to determine phase transition pressure is important because the presence of a phase transition may render invalid a fluid sample taken for the purpose of composition analysis. In production logging, it is necessary to know the phase transition pressure because phase separation limits production flow rate.

A sample containing retrograde condensates is typically found when a fluid sample is taken from a deep hot oil and gas reservoir by wireline fluid sampling (WFS). Retrograde condensates are susceptible to downhole phase separation, including dew precipitation and bubble creation. Phase separation downhole in oilfield fluids from a particular formation limits the "drawdown" pressure drop that can be used in production of crude oil from that formation, thereby limiting the flow rate of crude oil production from that formation. Phase separation in oilfield fluids is separation into a continuous phase and a discrete phase, either into a gas phase and a liquid phase, or into a continuous liquid phase and a discrete liquid phase. Phase separation is of particular concern when attempting to obtain valid samples from deep hot oil and gas reservoirs. For a sample to be valid, it must be of single phase.

When dew precipitation occurs in a downhole pipe or flow line, dew typically forms first as a mist. After dew forms as a mist, most of the dew deposits on the walls of the containing pipe in the form of film. Liquid enriched in heavier ends can flow as an annular film on the inner surface of the pipe or flow line, with gas or depleted condensate entrained in the middle of the pipe or flow line. Sometimes mist coalesces into slug form.

The phase diagram of FIG. 16 (prior art) shows a pressure reduction (represented by arrow 77) taking the fluid from single-phase domain 71 into multi-phase domain 72 to produce dew precipitation as the dew precipitation transition boundary 74 is crossed. Dew precipitation transition boundary 74 is the single-phase/multi-phase boundary between critical point 75 and cricondentherm 79. Bubble creation transition boundary 73 is the single-phase/multi-phase boundary at lower pressures and temperatures bounded by critical point 75. Bubbles are created when transition boundary 73 is crossed by a pressure reduction (represented by arrow 76) taking the fluid from single-phase domain 71 into multi-phase domain 72.

Retrograde condensates are defined by having formation conditions where the formation temperature is between the fluid critical point and the cricondentherm. At the critical point of a fluid ("critical point" is a term used in thermodynamics), distinction between gaseous phase and liquid phase ceases to exist. In most situations, formation fluid has one and only one critical point in the whole pressure and temperature range. The "cricondentherm" is the highest temperature in which dew is still able to precipitate out of mixture, and where the reservoir pressure is above the dew line. FIG. 16 shows critical point 75 and cricondentherm 79. The pressure reduction used for fluid sample extraction can cause dew precipitation. If dew precipitation occurs, it can take the form of a mist, thin film, or relatively large slug, depending on sampling conditions. The phase separation is usually from single-phase to two-phase. (More rarely 3 or 4 phases can occur). In the phase diagram of FIG. 16, a pressure reduction would appear as a descent from the single-phase domain 71 into the multi-phase domain 72. Phase transition pressure is the formation pressure at boundary 73 or 74.

SUMMARY OF THE INVENTION

The invention provides a method for determining phase transition pressure of downhole retrograde condensate. An OBM-contamination value is produced from a time-series of fluorescence values produced by measuring fluorescence emitted from a single-phase flow of OBM-contaminated formation fluid in a downhole cell during a cycle of time. The pressure of fluid in the cell is set at a transition boundary by incrementing drawdown pressure and monitoring the presence or absence of a phase transition. An apparent phase transition pressure value associated with the cycle of time is produced by setting apparent phase transition pressure value equal to cell pressure. This process is repeated for several cycles of time to produce a number of pairs of OBM-contamination value and apparent phase transition pressure value as OBM-contamination decreases over time. The value of phase transition pressure is determined by extrapolating from a representation of apparent phase transition pressure values versus OBM-contamination values.

In a preferred embodiment, a time-series of fluorescence ratio values is produced by establishing single-phase flow in a downhole cell and measuring fluorescence ratio from the single-phase flow of OBM-contaminated formation fluid in the cell. An OBM-contamination value is produced from the time-series of fluorescence ratio values by curve-fitting the time-series of fluorescence values using an OBM-determination asymptotic model. Pressure in the cell is set at a transition boundary by incrementing drawdown pressure and monitoring the presence or absence of a phase transition. An apparent phase transition pressure value by setting apparent phase transition pressure value equal to pressure of fluid in the cell. The above process is repeated to produce an OBM-contamination value and an apparent phase transition pressure for each cycle of a plurality of cycles. The value of phase transition pressure is determined by extrapolating from a representation of apparent phase transition pressure values versus OBM-contamination values.

The invention also provides a method for detecting a phase transition in a flow of retrograde condensate downhole. Formation fluid is moved through a phase-segregator and through a downhole cell. Fluid in the cell is illuminated with fluorescence excitation light and fluorescence is measured at intervals of time to produce a time-series of fluorescence values. Change in fluorescence value is compared to a predetermined value and a phase transition is recognized when at least one change in fluorescence value is greater than the predetermined value.

The invention also provides a method for establishing single-phase flow of retrograde condensate downhole. Formation fluid is moved through a phase-segregator and through a downhole cell. Fluid in the cell is illuminated with fluorescence excitation light and fluorescence is measured at intervals of time to produce a time-series of fluorescence values. After each measurement the time-series of fluorescence values is tested for a change in fluorescence greater than a predetermined value indicative of a phase transition, and drawdown pressure is decreased, until testing indicates no phase transition, indicative of single-phase flow.

The invention also provides a method for establishing multi-phase flow of retrograde condensate downhole. Formation fluid is moved through a phase-segregator and through a downhole cell. Fluid in the cell is illuminated with fluorescence excitation light and fluorescence is measured at intervals of time to produce a time-series of fluorescence values. After each measurement, the time-series of fluorescence values is tested for a change in fluorescence not greater than a predetermined value indicative of a phase transition, and drawdown pressure is increased, until testing indicates at least one phase transition, indicative of multi-phase flow.

The invention also provides a method for setting pressure in the cell at a transition boundary in a flow of retrograde condensate downhole. A time-series of fluorescence values is produced by measuring fluorescence from a single-phase flow of OBM-contaminated formation fluid in a downhole cell.

In a preferred embodiment of the method for setting pressure in the cell at a transition boundary, the method includes (i) producing a first time-series of fluorescence values, testing the first time-series of fluorescence values for single-phase flow, and establishing single-phase flow if single-phase flow is not detected; (ii) producing a second time-series of fluorescence values, testing the second time-series of fluorescence values for multi-phase flow, increasing drawdown pressure by a first defined increment if multi-phase flow is not detected, and repeatedly increasing drawdown pressure and testing until multi-phase flow is established; (iii) producing a third time-series of fluorescence values, testing the third time-series of fluorescence values for single-phase flow, decreasing drawdown pressure by a second defined increment smaller than the first defined increment if single-phase flow is not detected, and repeatedly decreasing drawdown pressure and testing until single-phase flow is established, thereby setting pressure in the cell at a transition boundary on the single-phase flow side of the boundary.

In an alternative embodiment of the method for setting pressure in the cell at a transition boundary, the method establishes multiphase flow, establishes single-phase flow by repeatedly decreasing drawdown pressure and testing, and establishes multi-phase flow by repeatedly increasing drawdown pressure and testing, thereby setting pressure in the cell at a transition boundary on the multi-phase flow side of the boundary.

DETAILED DESCRIPTION

General

The invention provides a method and apparatus for determining phase transition pressure of downhole retrograde condensate. The invention is suitable for use in borehole investigative logging or in production logging.

Preferred Embodiments of Method and Apparatus

Figure 1:
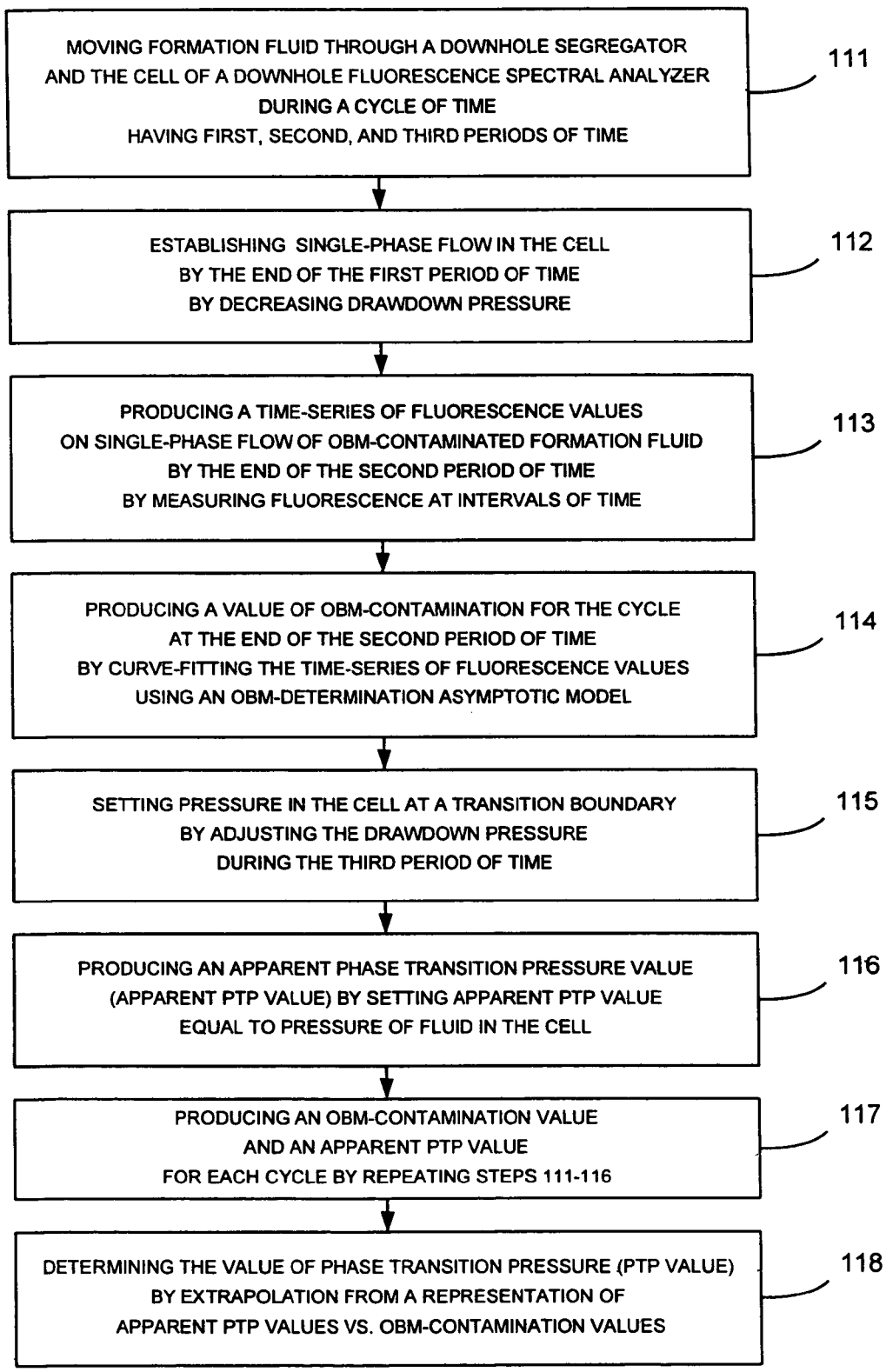
FIG. 1 is a flowchart illustrating a first preferred method of the invention for determining phase transition pressure of downhole retrograde condensate.
Figure 2:
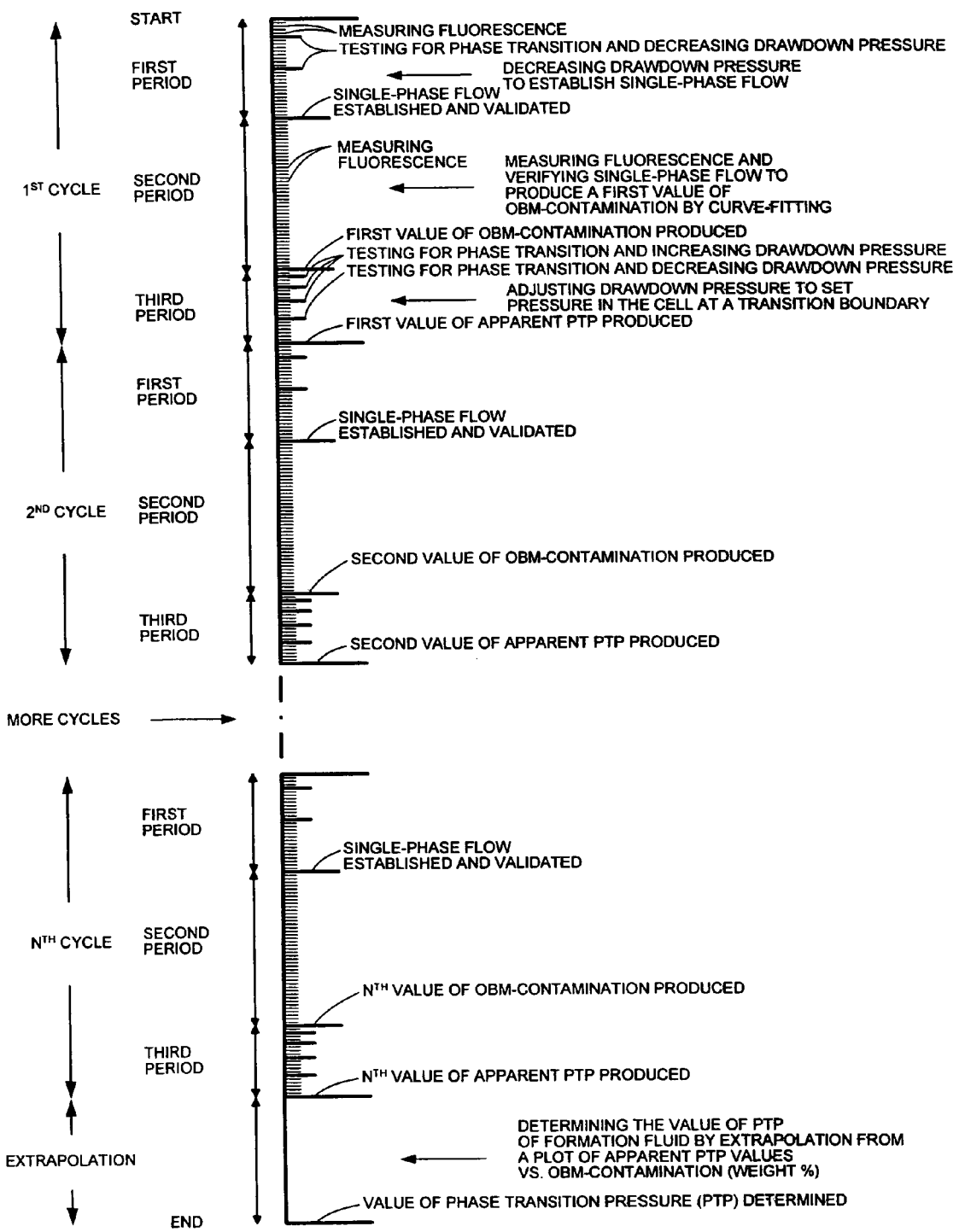
FIG. 2 is a time-line graph illustrating the sequence and timing of the major steps of the method of FIG. 1.

A preferred embodiment of the method of the invention is illustrated in the flowchart of FIG. 1 and the time-line graph of FIG. 2. FIG. 1 illustrates the method. FIG. 2 is a graph illustrating the timing of the method. The method is shown in summary form in FIG. 1, and is illustrated in more detail in the flowcharts of FIGS. 3–7 and the graphs of FIGS. 8, 13, 15 and 16.

A preferred embodiment of the apparatus of the invention is illustrated in FIGS. 9–12 and 14.

Detailed Disclosure of the Method

In a preferred embodiment of the method, an OBM-contamination value is produced from a first time-series of fluorescence values measured from a single-phase flow of OBM-contaminated formation fluid in a downhole cell in a first cycle. An apparent phase transition pressure is measured in the first cycle as being equal to the pressure of fluid in the cell when cell pressure is set at a transition boundary. Additional pairs of OBM-contamination value and apparent phase transition pressure are determined in this way for each of a plurality of cycles. The value of phase transition pressure is extrapolated from a representation of apparent phase transition pressure values versus OBM-contamination values.

Major steps of FIG. 1 are as follows:
a) producing an OBM-contamination value for a first cycle from a time-series of fluorescence values measured on single-phase flow of OBM-contaminated formation fluid in a cell during the first cycle;
b) producing an apparent phase transition pressure value for the first cycle, having set pressure in the cell at a transition boundary in the first cycle;
c) repeating a) and b) to produce OBM-contamination values and apparent phase transition pressure values for several cycles; and
d) determining the value of phase transition pressure by extrapolating a representation of apparent phase transition pressure values versus OBM-contamination values.

These steps will be discussed in turn below.

Producing an OBM-Contamination Value

A time-series of fluorescence values is produced by processes 111–113 of FIG. 1. Item 111 includes moving formation fluid through a downhole phase segregator and through the cell of a downhole fluorescence spectral analyzer during a first cycle of time having first, second, and third periods of time.

Process 117 includes repeating 111–116. So, referring now to FIG. 2, formation fluid moves continuously through the downhole segregator and the cell from the beginning of the first period of the first cycle through the third period of the $N^{th}$ cycle. Regarding the scale of FIG. 2, each first period of time may be in the range of approximately 2–10 minutes. Each second period of time may be in the range of approximately 20 minutes or more. Each third period of time may be in the range of approximately 5–10 minutes. Accordingly, each cycle may last in the range of approximately 30–40 minutes or more. In contrast, measuring fluorescence of formation fluid is very fast, each measurement typically taking less than 0.3 seconds. So a large number of measurements are taken in each of the three periods of time. The three periods of time are not necessarily fixed in length but are variable, each process taking only the time needed to meet its termination criterion. However, the time needed to meet the criterion can vary significantly, depending on formation properties.

Figure 3:
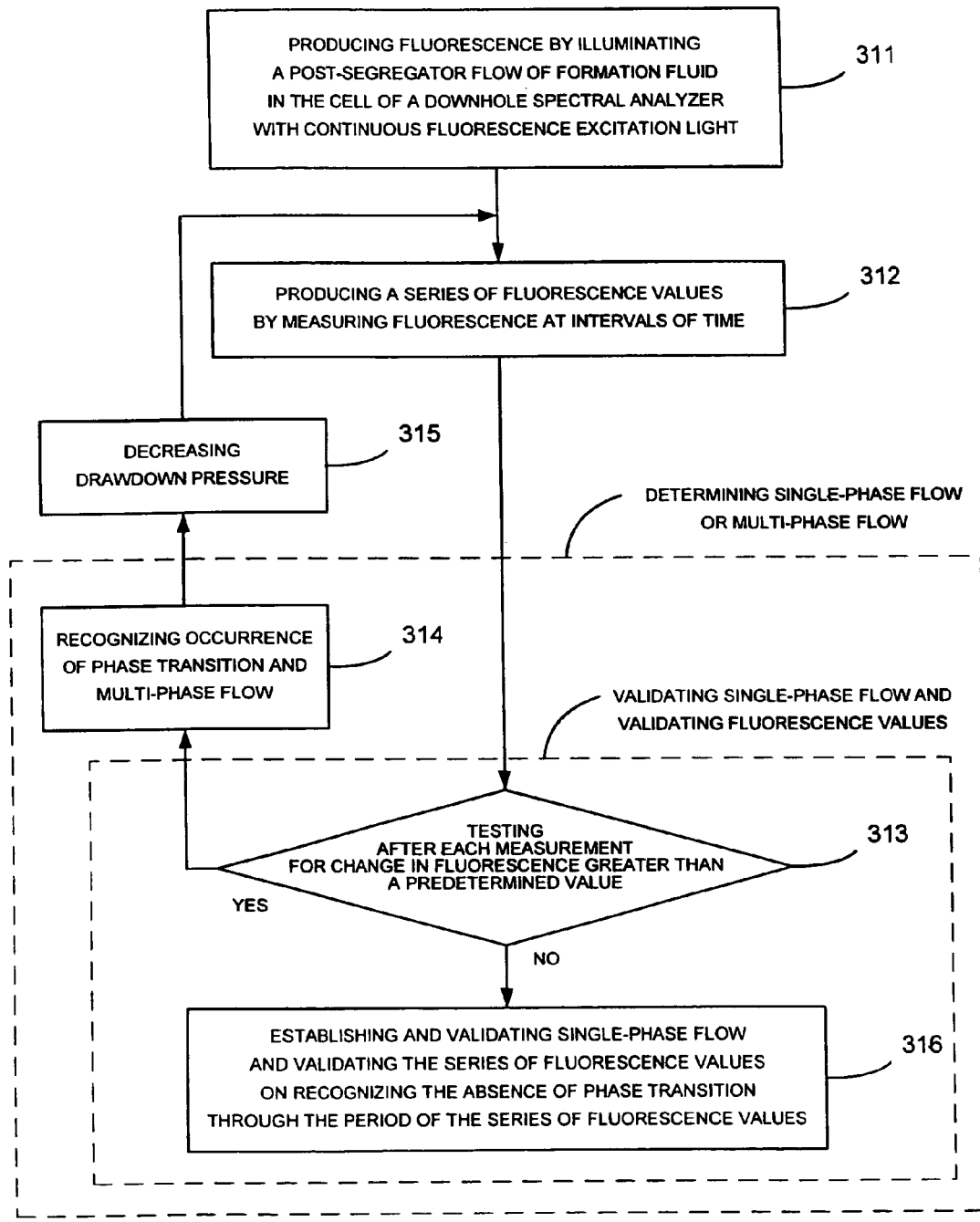
FIG. 3 is a flowchart illustrating a preferred method for establishing single-phase flow.

The process of establishing single-phase flow in the cell, 112 in FIG. 1, is illustrated in detail in FIG. 3. The process of FIG. 3 includes establishing and validating single-phase flow and validating the series of fluorescence values on recognizing the absence of phase transition through the period of the series of fluorescence values (316). It further includes measuring fluorescence at intervals of time to produce a time-series of fluorescence values (312), testing after each measurement for change in fluorescence value greater than the predetermined value (313), and decreasing drawdown pressure until no change in fluorescence value greater than the predetermined value is detected in a time-series of fluorescence values (315). In the preferred embodiment, "measuring fluorescence" means measuring fluorescence ratio. The excitation wavelength is preferably 470 nm. The fluorescence ratio is the ratio of fluorescence intensities measured at wavelengths of 550 nm and 680 nm.

In other embodiments, "measuring fluorescence" may include measuring any one of fluorescence intensity, fluorescence lifetime or fluorescence spectrum, or any combination of fluorescence ratio, fluorescence intensity, fluorescence lifetime, and fluorescence spectrum. Fluorescence lifetime is included because quenching decreases as contamination decreases. Fluorescence spectrum is included because the shape of the fluorescence spectrum changes as contamination decreases.

Single-phase flow is established by the end of the first period of time. FIG. 2 illustrates the sequence. See "measuring fluorescence", "testing for phase transition and decreasing drawdown pressure" and "single-phase flow established and validated".

Decreasing drawdown is accomplished by decreasing the pump rate. Pump rate is decreased at intervals indicated in FIG. 2 at "testing for phase transition and decreasing drawdown pressure".

An OBM-contamination value for the first cycle is produced in a second period of time by curve-fitting the time-series of fluorescence values obtained in the second period of time using an OBM determination asymptotic model (114 in FIG. 1). The first value of OBM-contamination is produced at the end of the second period of time. See FIG. 2 "first value of OBM-contamination produced".

In determining OBM filtrate fraction, the OBM determination asymptotic model uses the equation $$\text{fluorescence ratio } (t) = r_1 + r_2 t^{-x},$$

where t is time, $r_1$ and $r_2$ are constants, and exponent x is a decay value. Preferably, x is within the range 0.2 to 0.8, and is approximately 5/12.

The two constants $r_1$ and $r_2$ are determined by fitting a time-series of fluorescence values obtained in a first period of time to the equation.

Detailed techniques for using OBM-determination asymptotic models are described in U.S. Pat. No. 6,274,865 B1, issued Aug. 14, 2001, and U.S. Pat. No. 6,350,986 B1, issued Feb. 26, 2002. These two patents are hereby incorporated herein by reference.

Producing an Apparent Phase Transition Pressure Value

Producing an apparent phase transition pressure value includes "setting pressure in the cell at a transition boundary by adjusting the drawdown pressure during the third period of time" (115 of FIG. 1) and "producing an apparent phase transition pressure value (apparent PTP value) by setting apparent PTP value equal to pressure of fluid in the cell" (116 of FIG. 1).

Figure 4:
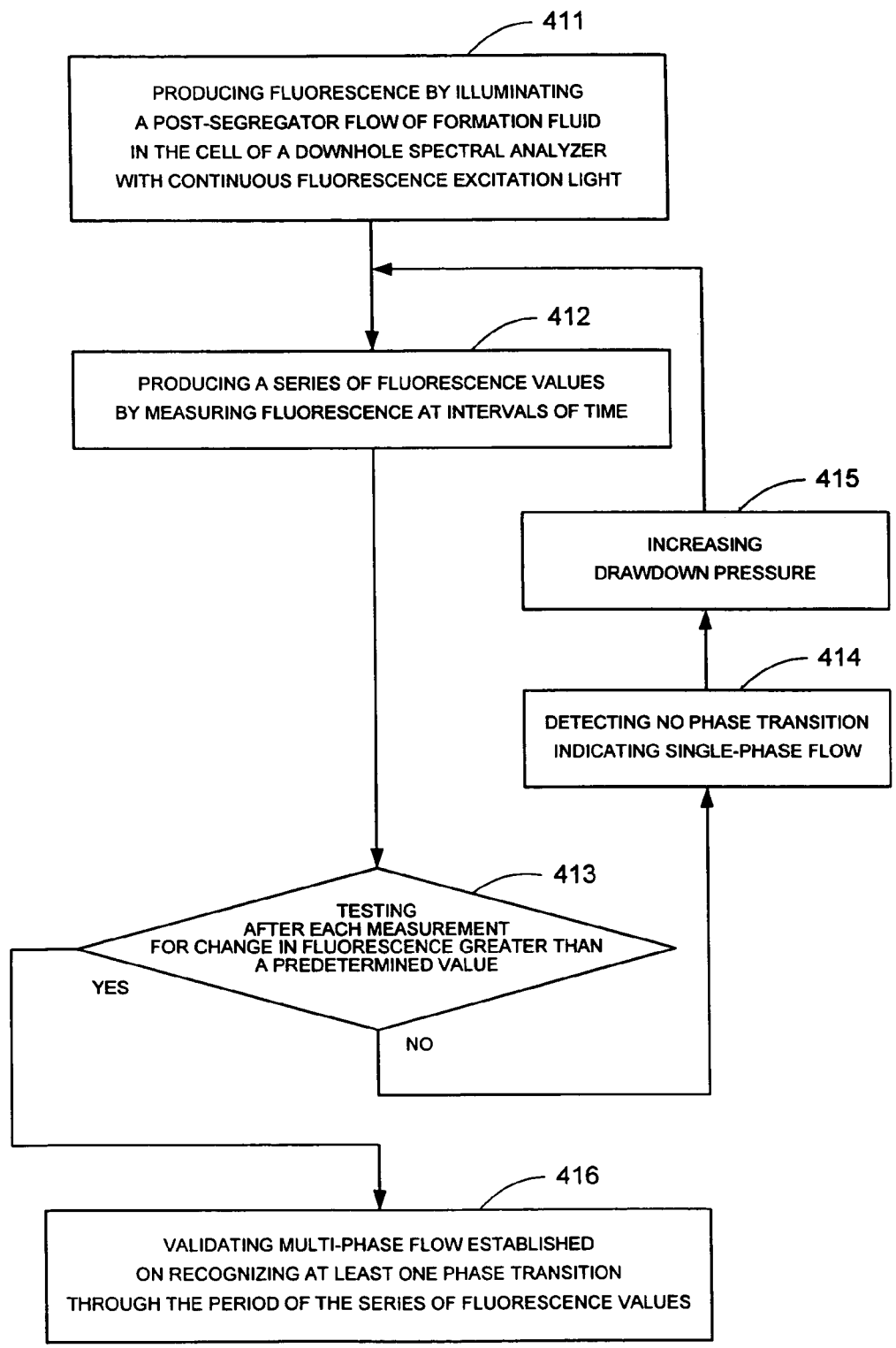
FIG. 4 is a flowchart illustrating a preferred method for establishing multi-phase flow.
Figure 5:
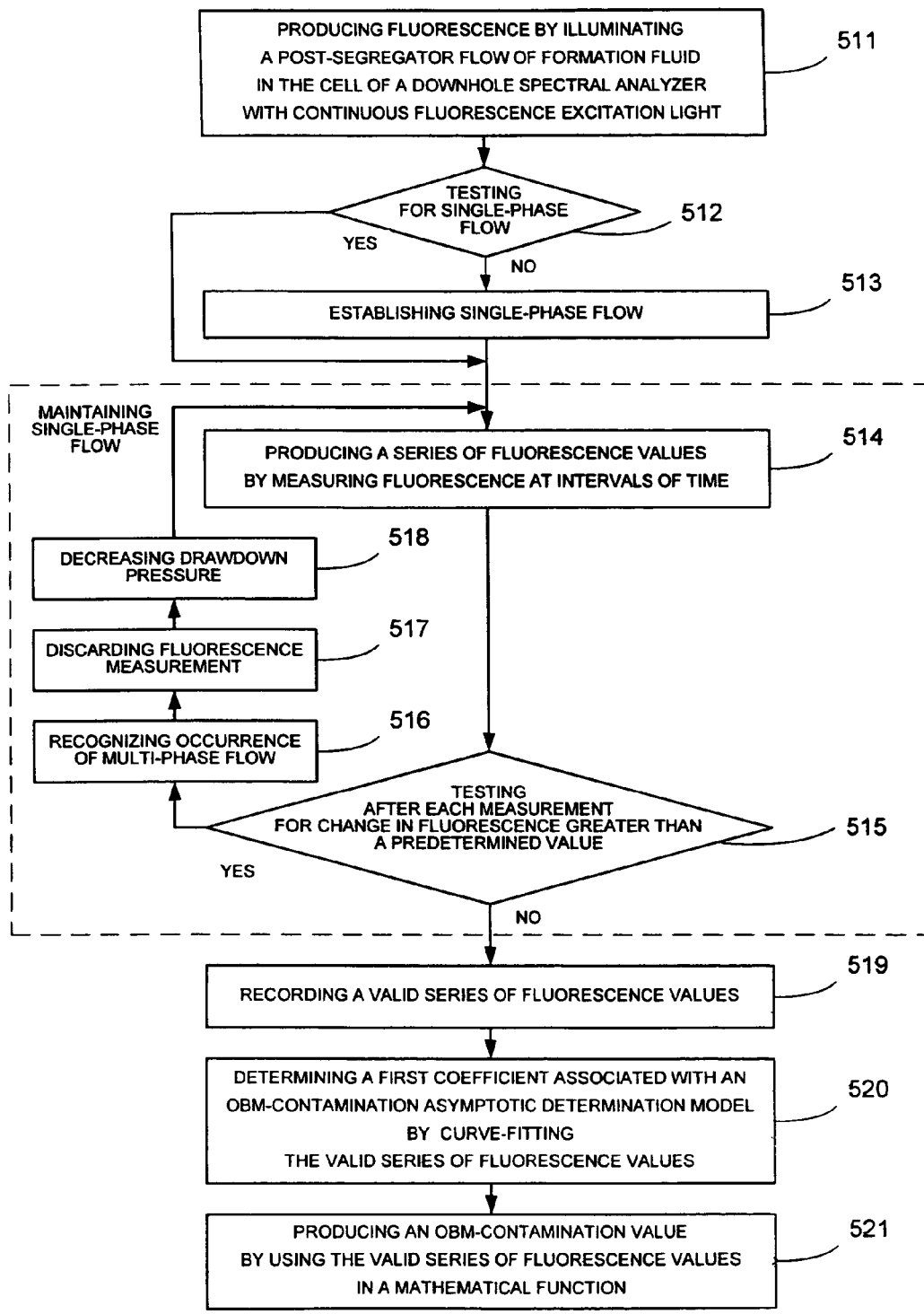
FIG. 5 is a flowchart illustrating a preferred method for determining OBM filtrate fraction.
Figure 6:
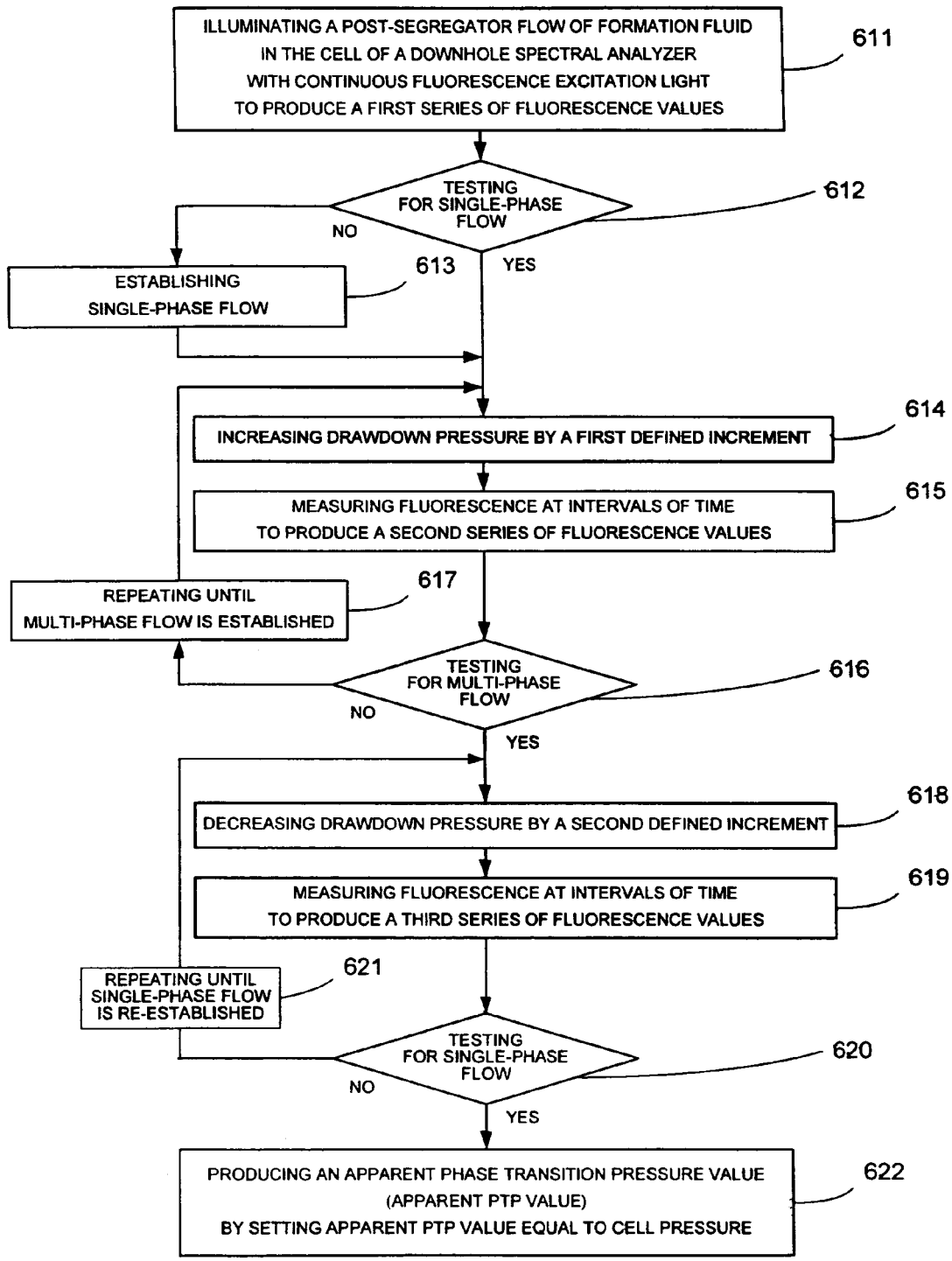
FIG. 6 is a flowchart illustrating a preferred method for setting pressure in the cell at a transition boundary in a flow of retrograde condensate downhole.

In the preferred embodiment, the process of setting pressure in the cell at a transition boundary is described in detail in FIG. 6, with reference also to FIG. 3 for detail of detecting a phase transition and for detail of establishing and validating single-phase flow; and to FIG. 4 for detail of establishing and validating multi-phase flow.

Having set pressure in the cell at or arbitrarily close to the unknown phase transition pressure, the apparent phase transition pressure value ("apparent PTP value") is produced by setting apparent PTP value equal to cell pressure.

A phase transition is recognized when at least one change in fluorescence value is greater than the predetermined value (313 and 314 in FIG. 3).

FIG. 3 further shows detail of establishing and validating single-phase flow (311–316).

FIG. 4 shows detail of establishing and validating multi-phase flow (411–416).

Note that validating single-phase flow for a series of fluorescence values requires the absence of phase transition through the period of the series of fluorescence values, whereas only one phase transition is needed in the period of the series of fluorescence values to indicate multi-phase flow.

Figure 16:
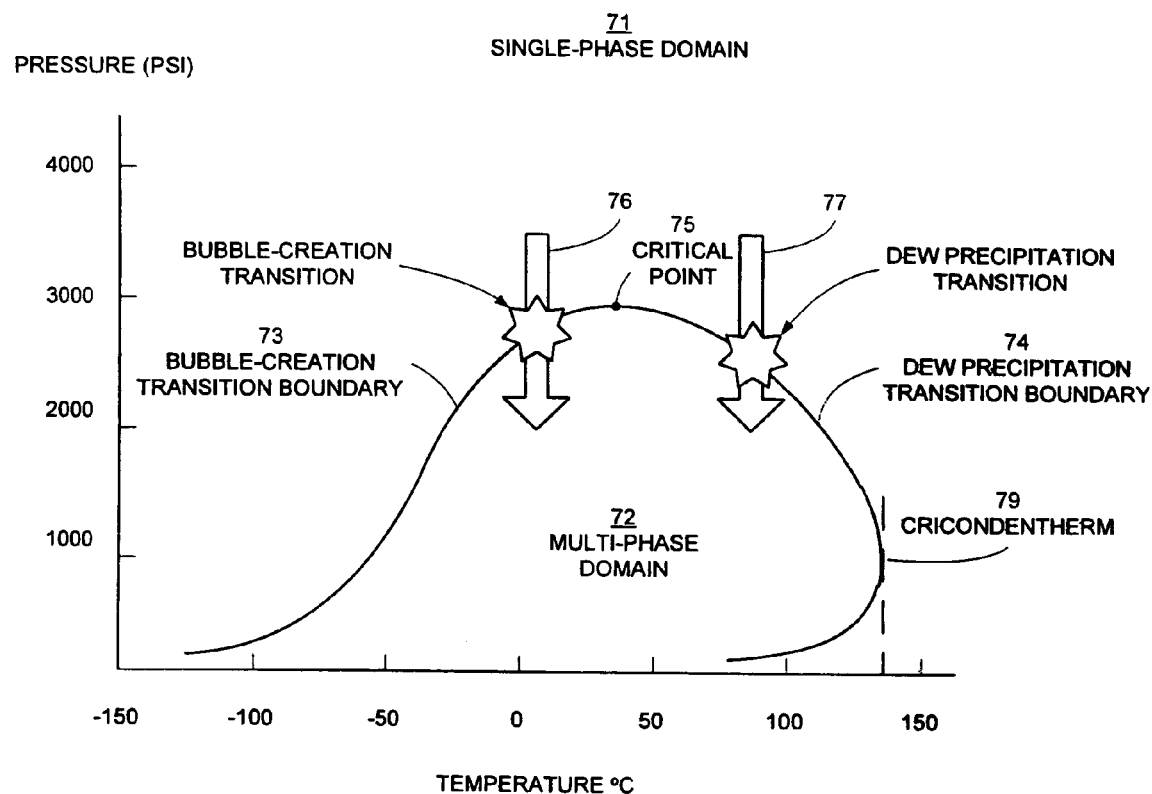
FIG. 16 is a phase diagram (prior art) showing phase transition conditions in retrograde condensate.

FIG. 6 shows detail of the process for producing an apparent phase transition value using the series of fluorescence values. The process includes setting pressure in the cell at a transition boundary. FIG. 16 is a phase diagram (prior art) showing phase transition conditions in retrograde condensate. The transition boundary referred to above can be either a bubble creation transition boundary 73, or a dew precipitation transition boundary 74 shown in the phase diagram of FIG. 16.

Establishing single-phase flow (611–613 in FIG. 6) puts cell pressure in the single-phase domain (71 in FIG. 16). Repeatedly increasing drawdown pressure by a sufficient number of first increment (614 in FIG. 6) puts cell pressure in the multi-phase domain (72 in FIG. 16). Then repeatedly decreasing drawdown pressure by a sufficient number of second increment (618 in FIG. 6) puts cell pressure back in the single-phase domain proximate to a transition boundary. In the preferred embodiment, the second increment is smaller than the first increment. This produces relatively large steps in change of drawdown pressure to move cell pressure across the boundary quickly, and produces relatively small steps to move cell pressure in the opposite direction, so that on a second crossing of the transition boundary, cell pressure is very close to the boundary. This process can put cell pressure back in the single-phase domain quickly, and can ensure that cell pressure is very close to the unknown apparent phase transition pressure.

The process of the preferred embodiment for setting pressure in the cell at a transition boundary includes (i) producing a first time-series of fluorescence values, testing the first time-series of fluorescence values for single-phase flow, and establishing single-phase flow if single-phase flow is not detected, such as by decreasing drawdown pressure; (ii) producing a second time-series of fluorescence values, testing the second time-series of fluorescence values for multi-phase flow, increasing drawdown pressure by a first defined increment if multi-phase flow is not detected, and repeatedly increasing drawdown pressure and testing until multi-phase flow is established; (iii) producing a third time-series of fluorescence values, testing the third time-series of fluorescence values for single-phase flow, decreasing drawdown pressure by a second defined increment smaller than the first defined increment if single-phase flow is not detected, and repeatedly decreasing drawdown pressure and testing until single-phase flow is established, thereby setting pressure in the cell at a transition boundary on the single-phase flow side of the boundary.

Figure 7:
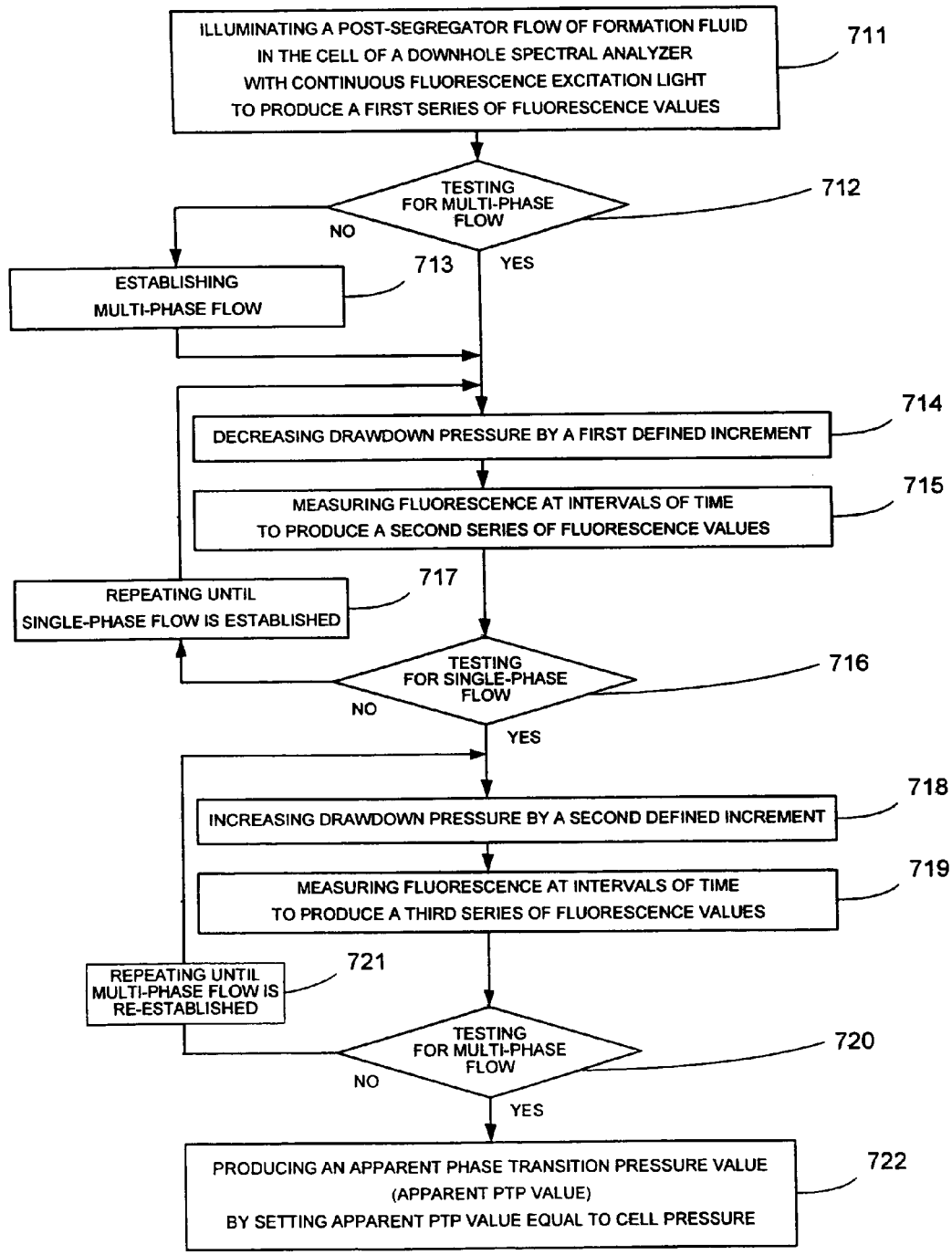
FIG. 7 is a flowchart illustrating an alternative method for setting pressure in the cell at a transition boundary in a flow of retrograde condensate downhole.

In an alternative embodiment shown in FIG. 7, of a process for producing an apparent phase transition value, the process first establishes multi-phase flow, decreases drawdown pressure in large increments until cell pressure crosses the transition boundary into the single-phase domain, then increases drawdown pressure in small increments to put cell pressure back in the multi-phase domain. This process, like the process of FIG. 6, can put cell pressure back in the multi-phase domain quickly, and can ensure that cell pressure is very close to the unknown phase transition pressure.

Having set pressure in the cell at, or very close to, the unknown phase transition pressure, the apparent phase transition pressure value ("apparent PTP value") is produced by setting apparent phase transition pressure value equal to cell pressure.

In the process of the alternative embodiment for setting pressure in the cell at a transition boundary, first multiphase flow is established, single-phase flow is established by repeatedly decreasing drawdown pressure and testing, and multi-phase flow is established by repeatedly increasing drawdown pressure and testing, thereby setting pressure in the cell at a transition boundary on the multi-phase flow side of the boundary.

Determining the Value of Phase Transition Pressure

Figure 8:
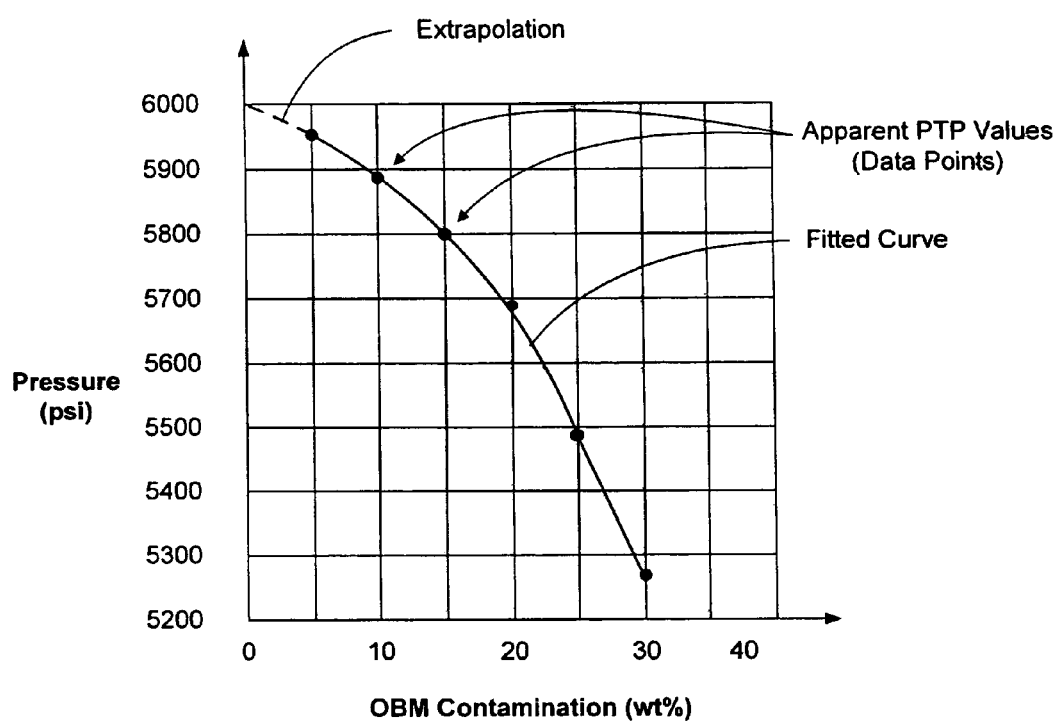
FIG. 8 is a graphical illustration of an extrapolation from a representation of apparent PTP values vs. OBM-contamination (weight %).

Determining the value of phase transition pressure includes producing an OBM-contamination value and an apparent phase transition pressure value for each cycle (117 of FIG. 1), and by extrapolating from a representation of apparent phase transition pressure values vs. OBM-contamination weight % (118 of FIG. 1). FIG. 8 is a graphical illustration of an extrapolation from a representation of apparent PTP values vs. OBM-contamination (weight %). The extrapolation shown dotted in FIG. 8 indicates a phase transition pressure of 6000 psi.

Detailed Disclosure of the Apparatus

Figure 9:
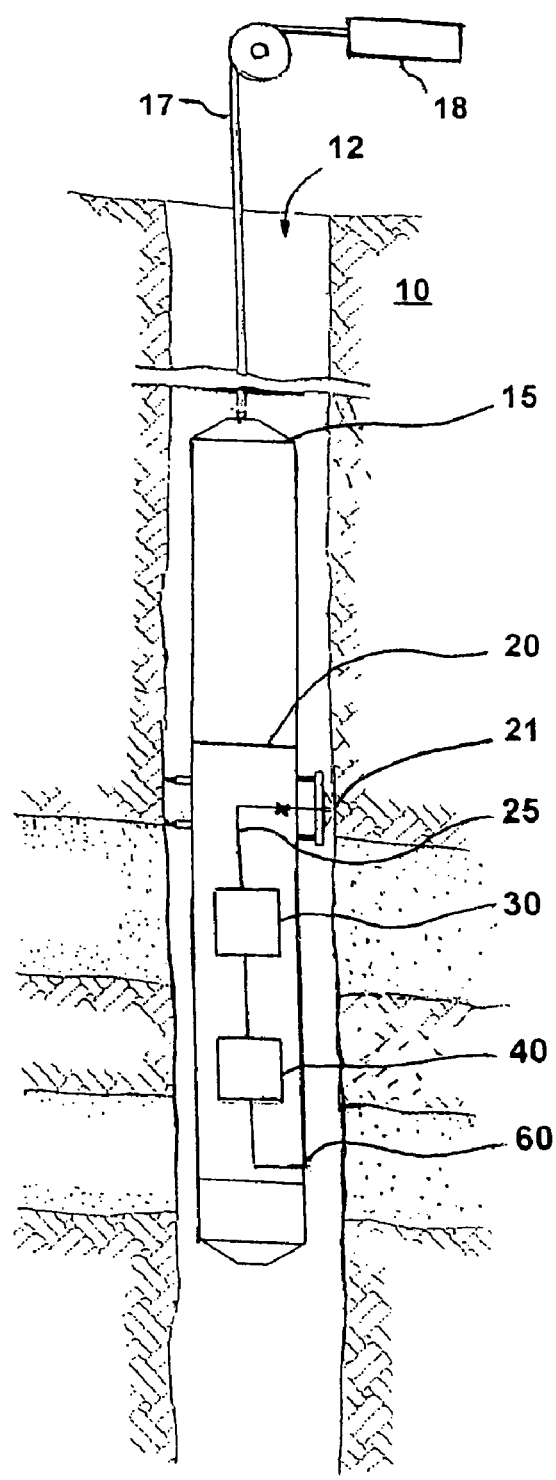
FIG. 9 is a schematic drawing of a first preferred embodiment the formation fluid analyzer of the invention.

FIG. 9 is a schematic drawing of a first preferred embodiment the formation fluid analyzer 20 located in a wireline formation tester 15.

Formation tester 15 is shown in borehole 12 of formation 10. Tester 15 is suspended by logging cable 17, and is electrically coupled to surface system 18. Formation fluid analyzer 20 is located within tester 15 with probe 21 protruding in operative position to receive fluid from the formation. Formation fluid analyzer 20 is shown to also include flow-line 25, segregator 30, fluorescence spectral analyzer 40, and pump-out line 60.

Figure 10:
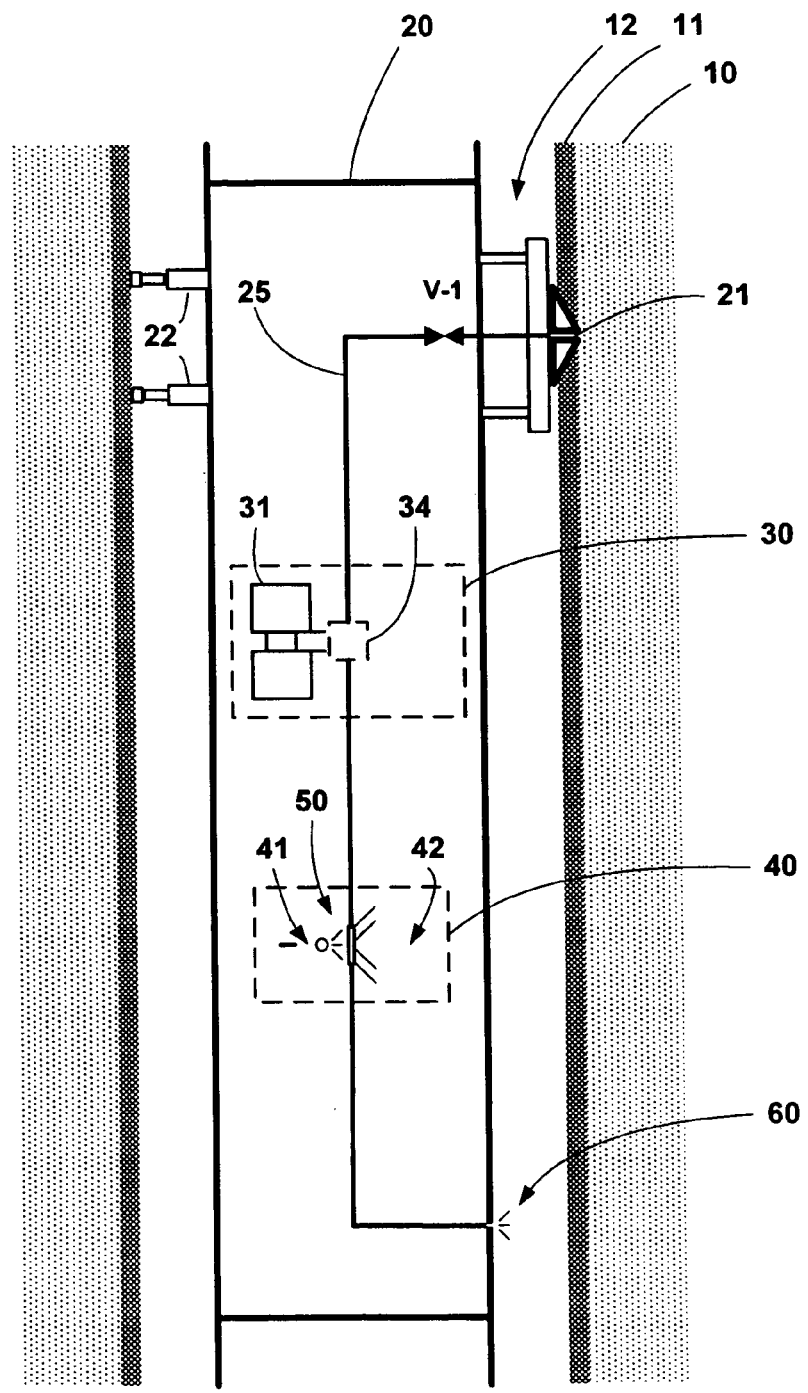
FIG. 10 shows detail of the first preferred embodiment of FIG. 9.

FIG. 10 shows detail of formation fluid analyzer 20 of FIG. 9. Probe 21 is adapted to receive downhole formation fluid by breaking through mud cake 11 to formation 10. Segregator 30 is coupled by an upper portion of flow-line 25 to receive formation fluid from the probe, and is further coupled by a lower portion of flow-line 25 to deliver segregated formation fluid to fluorescence spectral analyzer 40. Segregator 30 is adapted to draw formation fluid from formation via the probe, to perform gravity segregation on the fluid, and to pump a flow of segregated fluid through fluorescence spectral analyzer 40. Thus, segregator 30 performs three functions, drawdown of formation fluid via probe 21, gravity segregation of formation fluid if formation fluid is multi-phase, and delivery of post-segregator formation fluid to fluorescence spectral analyzer 40. Fluid flowing in this manner through the formation fluid analyzer exits at pump-out line 60.

FIGS. 9 and 10 show formation fluid analyzer 20 having probe 21, flow-line 25, segregator 30, fluorescence spectral analyzer 40, and pump-out line 60. For convenience these elements of formation fluid analyzer 20 are shown in a single module. However, typical prior art formation testers include multiple modules sharing a single probe, a single flow-line and a single pump-out line. The present invention is intended to include configurations wherein such elements are so distributed and shared.

Figure 11A:
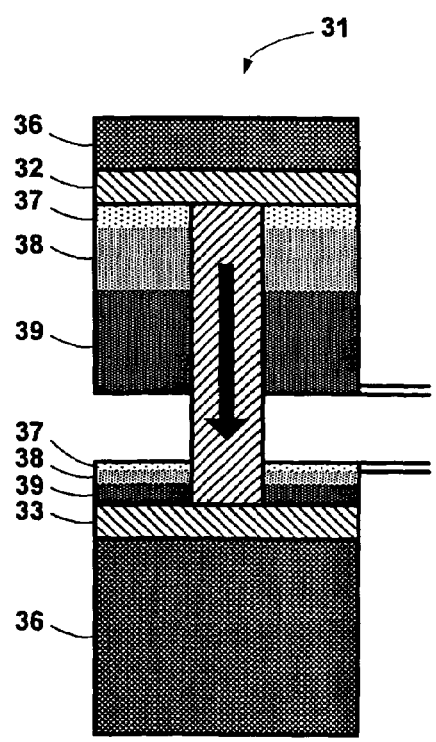
FIG. 11A shows the dual-action piston pump of the first preferred embodiment in downstroke motion.

FIG. 10 shows segregator 30 including dual-action piston pump 31. Pump 31 is shown in more detail in FIG. 11A. Pump 31 includes two cylinders and a single piston. The piston has an upper portion 32 and a lower portion 35. FIG. 11A shows pump 31 in down-stroke motion.

Figure 11B:
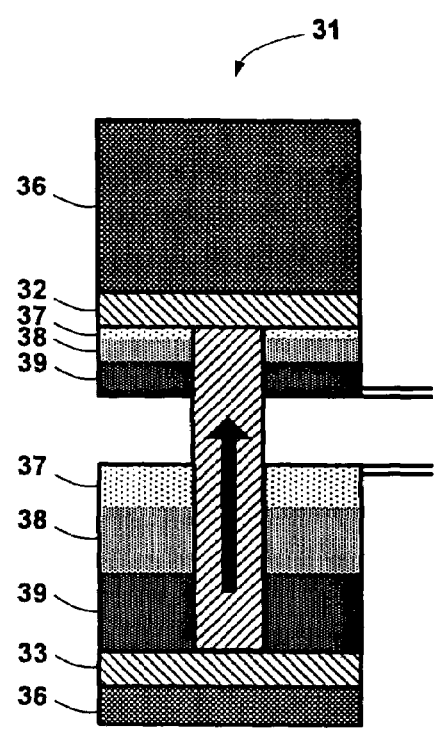
FIG. 11B shows the dual-action piston pump of the first preferred embodiment in up-stroke motion.

FIG. 11B shows the pump 31 in up-stroke motion.

Figure 12:
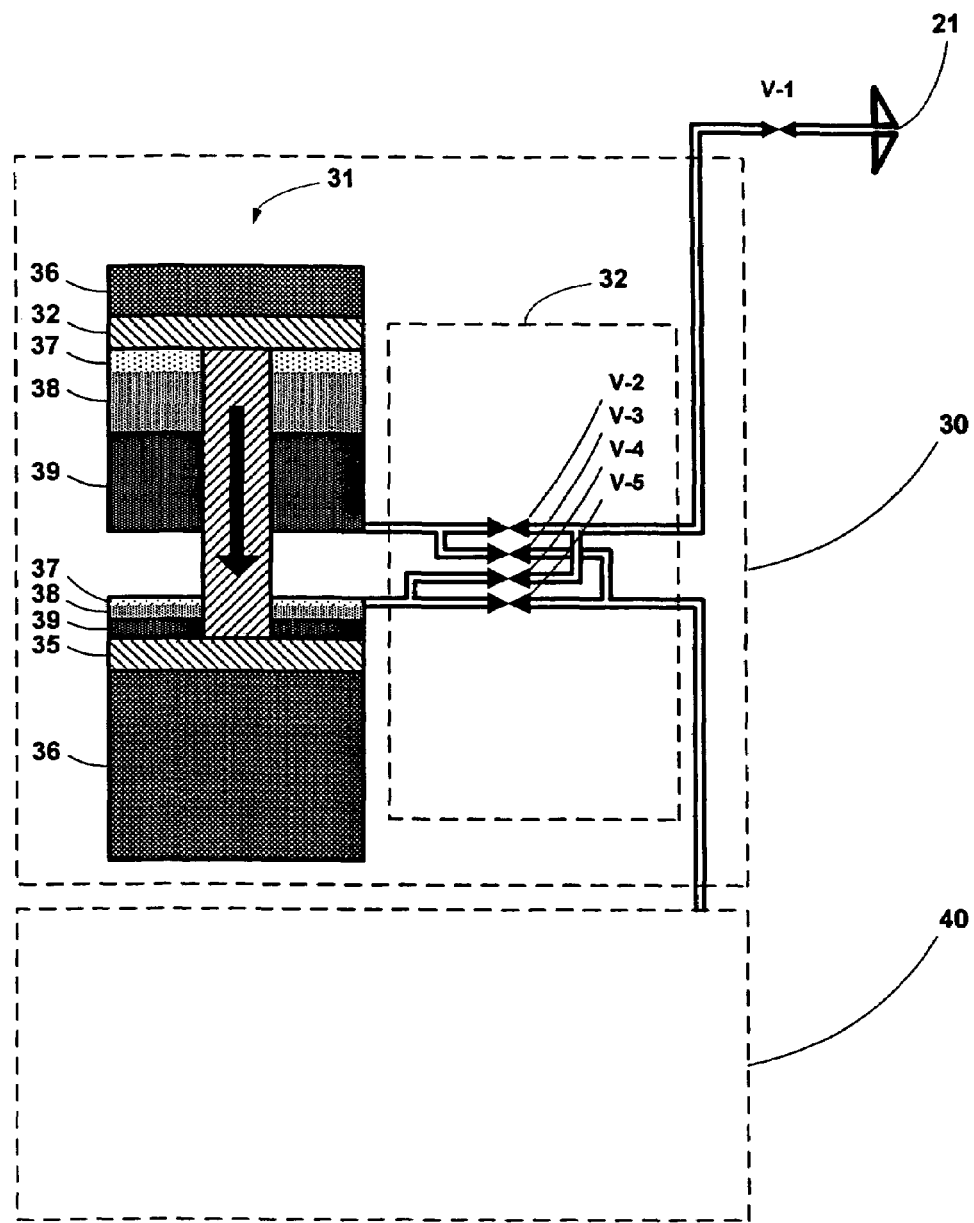
FIG. 12 shows the switched valve arrangement used to couple the segmentor ports to the flow-line in synchrony with piston position.

FIG. 12 shows segregator 30 coupled to probe 21 via isolation valve V1. It also shows segregator 30 including dual-action piston pump 31 and switched valves V2–V5 in a valve arrangement. The valve arrangement is used to couple the input/output ports of the dual-action piston pump to the upstream/downstream portions of the flow-line in synchrony with down-stroke/up-stroke motion of the piston. This arrangement ensures that formation fluid is drawn from the (upstream) probe and a segmented flow (if there is phase separation) is delivered to the (downstream) fluorescence spectral analyzer.

Figure 13:
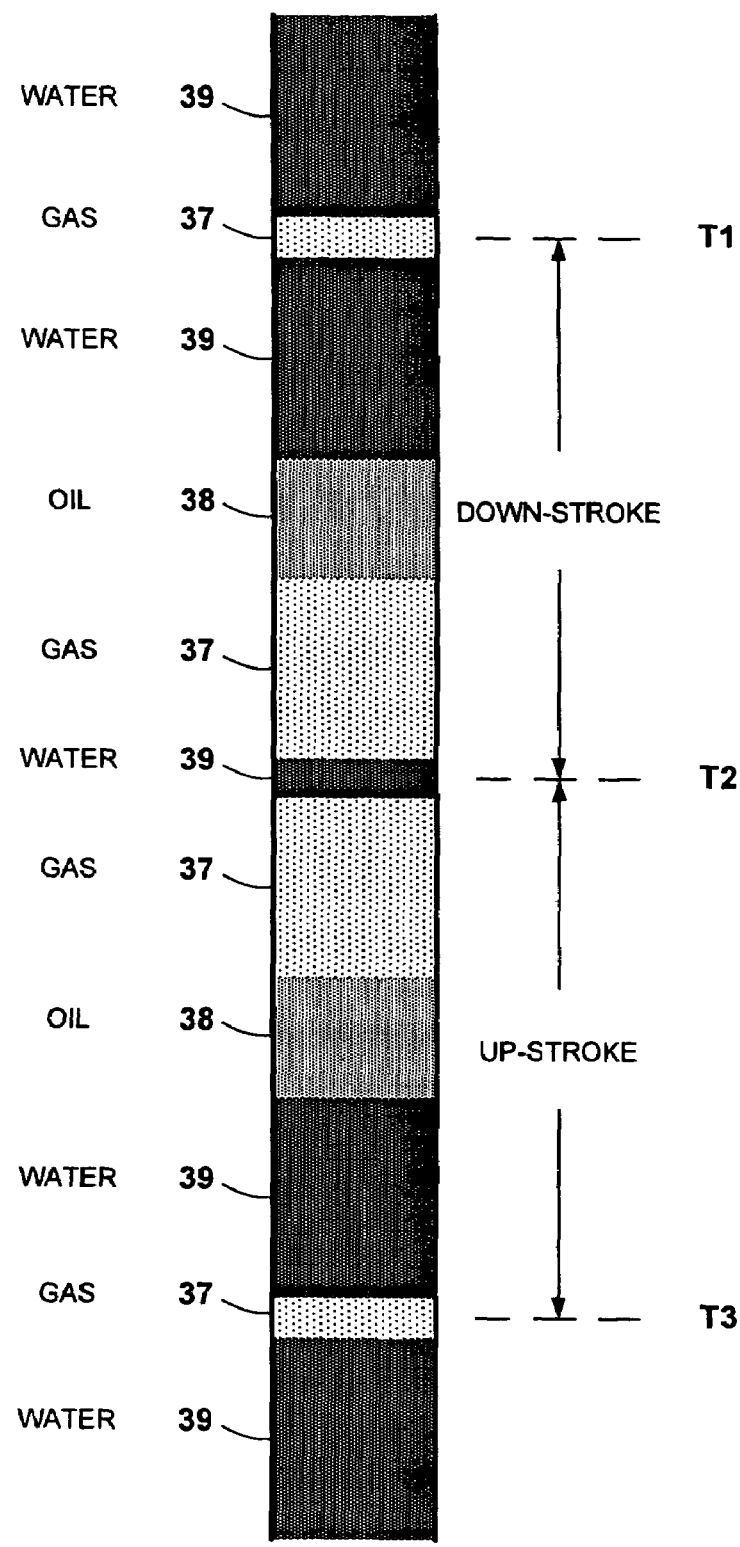
FIG. 13 shows the segmented flow produced by the segmentor.
Figure 14:
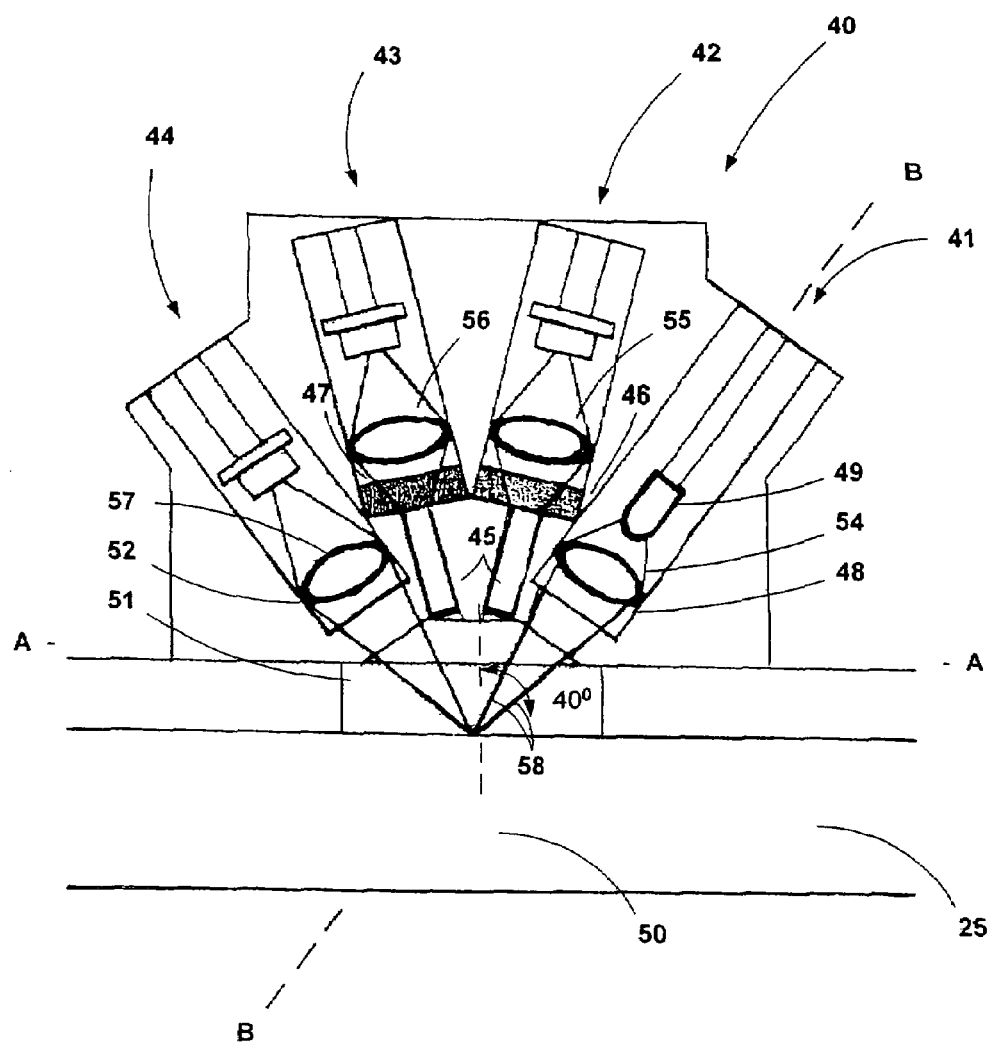
FIG. 14 is a schematic illustration of the fluorescence spectral analyzer of the first preferred embodiment.

FIG. 13 shows a typical segmented flow produced by gravitational segmentation in segmentor 30 (shown in FIG. 12) and pumped through fluorescence spectral analyzer 40 (shown in FIGS. 10 and 14). A down-stroke of typically 60 seconds is followed by an up-stroke of equal duration.

FIGS. 12 and 13 show a segmented flow of first water 39, then oil 38, then gas 37 moving downstream during a downstroke.

The sequence of phases in down-stroke motion is water, oil, gas. The sequence of phases in up-stroke motion is gas, oil, water. Fluorescence measurements are being made at the rate of approximately three per second through all downstrokes and up-strokes.

Approximately 1800 fluorescence measurements may be taken in a 10 minute (600 seconds) first period of time.

FIG. 14 is a schematic illustration of the fluorescence spectral analyzer of the preferred embodiment.

Fluorescence spectral analyzer 40 includes a portion of fluid flow-line 25 defining spectral analyzer cell region 50, a sapphire optical window 51, a sapphire optical prism 52, excitation light source (470 nm) 41 with light-emitting diode (LED) 49 and converging lens 54 focusing light rays 58, first fluorescence detector (550 nm) 42 with converging lens 55, second fluorescence detector (680 nm) 43 with converging lens 56, fluorescence reflection detector (470 nm) 44 with converging lens 57, two glass conduits 45, short-pass optical filter (500 nm) 48, long-pass optical filter (550 nm) 46, and long-pass optical filter (680 nm) 47. The tilt of excitation light source axis B—B away from the fluid interface of sapphire optical window 51 (line A—A) is preferably set, for sapphire, to about 40°.

Formation fluid analyzer 20 of FIG. 10 also includes data base means (not shown), and a processing means (not shown) for receiving and processing measurement data from the fluorescence spectral analyzer.

Fluids drawn from the formation into spectral analyzer cell region 50 are illuminated by excitation light. Emitted fluorescent light is detected to produce fluorescence intensity and other related measured values. The signals are processed, based on information in the data base relating to the different methods described above, to determine a selected characteristic of formation fluid. The excitation wavelength is preferably 470 nm. The fluorescence detection wavelengths are preferably 550 nm and 680 nm. Fluid flow is maintained by dual-action piston pump 31 shown in FIG. 10. The fluorescence spectral analyzer is capable performing fluorescence measurements on a flowing sample.

Illustrative Data (Prior Art)

Table 1 below lists populations and lifetimes (in nanoseconds) for Sales crude oil at different dilutions and emission wavelengths for 316-nm excitation. Table 1 corresponds to Table II from "Fluorescence Lifetime Studies of Crude Oils", Wang, X., Mullins O. C., Applied Spectroscopy, Vol. 48, No. 8, 1994.

TABLE 1

| Dilution | 370 nm | | 440 nm | | 500 nm | | 560 nm | |
|---|---|---|---|---|---|---|---|---|
| | τ | pop | τ | pop | τ | pop | τ | pop |
| Neat | 1.05 | 1.0 | 1.80 | 0.67 | 2.38 | 0.5 | 3.03 | 0.56 |
| | | | 1.15 | 0.33 | 0.79 | 0.5 | 1.03 | 0.44 |
| 1:5 | 1.55 | 0.71 | 7.89 | 0.09 | 10.02 | 0.10 | 11.40 | 0.11 |
| | 0.45 | 0.29 | 2.03 | 0.91 | 2.74 | 0.90 | 2.89 | 0.89 |

TABLE 1-continued

| Dilution | 370 nm | | 440 nm | | 500 nm | | 560 nm | |
|---|---|---|---|---|---|---|---|---|
| | τ | pop | τ | pop | τ | pop | τ | pop |
| 1:25 | 7.12 | 0.16 | 11.84 | 0.16 | 14.77 | 0.13 | 14.67 | 0.15 |
| | 1.97 | 0.84 | 2.94 | 0.84 | 3.08 | 0.87 | 2.71 | 0.85 |
| 1:125 | 13.22 | 0.09 | 17.5 | 0.11 | 16.82 | 0.11 | 16.72 | 0.14 |
| | 1.95 | 0.91 | 3.53 | 0.89 | 3.5 | 0.89 | 3.11 | 0.86 |
| 1:25,000 | 16.71 | 0.15 | 14.3 | 0.14 | 13.48 | 0.14 | | |
| | 2.76 | 0.85 | 2.9 | 0.86 | 2.9 | 0.86 | | |

Figure 15:
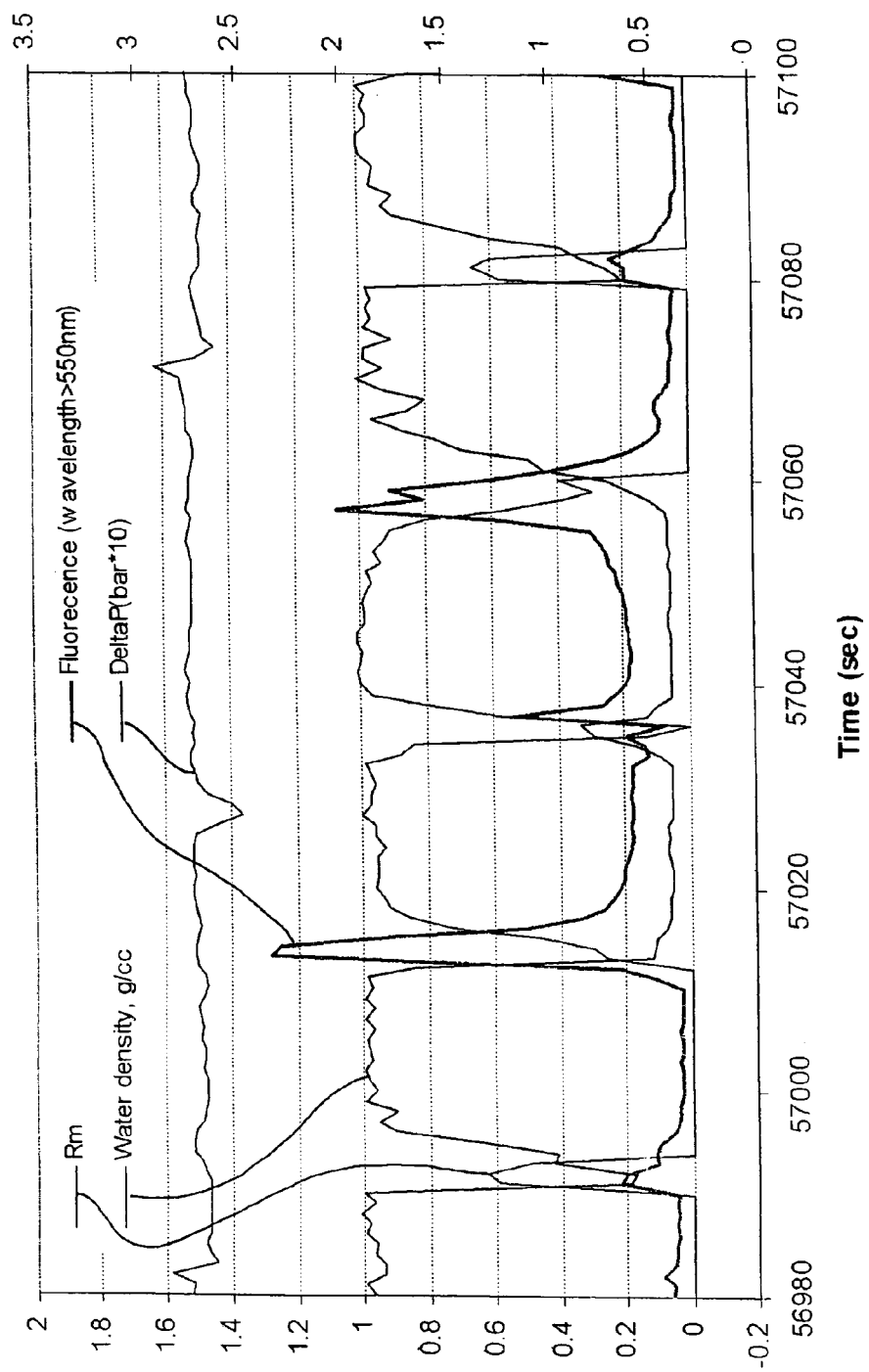
FIG. 15 is a graphical image of fluorescence measurements over a period of time corresponding to a little more than one down-stroke and one up-stroke of the segmentor of FIGS. 11A and 11B.

FIG. 15 is a graphical image of fluorescence measurements over a period of time corresponding to a little more than one down-stroke and one up-stroke of the segmentor of FIGS. 11A and 11B.

There has been described and illustrated herein methods for handling and determining properties of retrograde condensates downhole. While particular embodiments of the invention have been described, it is not intended that the invention be limited thereto, as it is intended that the invention be as broad in scope as the art will allow and that the specification be read likewise. It will therefore be appreciated by those skilled in the art that modifications could be made to the described embodiments of the invention without deviating from the scope of the invention as claimed below.

What is claimed is:

1. A method for determining phase transition pressure of downhole retrograde condensate, the method comprising:
   a) producing a time-series of fluorescence values by measuring fluorescence from a single-phase flow of OBM-contaminated formation fluid in a downhole cell;
   b) producing an OBM-contamination value from the time-series of fluorescence values;
   c) setting pressure in the cell at a transition boundary;
   d) producing an apparent phase transition pressure value by setting apparent phase transition pressure value equal to pressure of fluid in the cell;
   e) producing an OBM-contamination value, and a value of apparent phase transition pressure, for each cycle of a plurality of cycles by repeating steps (a)–(d); and
   f) determining the value of phase transition pressure using apparent phase transition pressure values and OBM-contamination values.

2. A method according to claim 1, wherein producing a time-series of fluorescence values includes measuring fluorescence ratio to produce a time-series of fluorescence ratio values.

3. A method according to claim 1, wherein producing a time-series of fluorescence values includes measuring fluorescence intensity to produce a time-series of fluorescence intensity values.

4. A method according to claim 1, wherein producing a time-series of fluorescence values includes measuring fluorescence spectrum to produce a time-series of fluorescence spectrum values.

5. A method according to claim 1, wherein producing a time-series of fluorescence values includes measuring fluorescence lifetime to produce a time-series of fluorescence lifetime values.

6. A method according to claim 1, wherein producing a time-series of fluorescence values includes establishing single-phase flow in the cell.

7. A method according to claim 6, wherein establishing single-phase flow in the cell includes decreasing drawdown pressure by decreasing rate of flow in the cell.

8. A method according to claim 6, wherein establishing single-phase flow in the cell includes detecting single-phase flow.

9. A method according to claim 8, wherein detecting single-phase flow includes testing for absence of change in fluorescence greater than a predetermined value.

10. A method according to claim 6, wherein establishing single-phase flow in the cell includes detecting multi-phase flow.

11. A method according to claim 10, wherein detecting multi-phase flow includes testing for change in fluorescence greater than a predetermined value.

12. A method according to claim 1, wherein producing a time-series of fluorescence values includes measuring fluorescence at intervals of time in a cell of a spectral analyzer.

13. A method according to claim 1, wherein producing an OBM-contamination value includes curve-fitting the time-series of fluorescence values.

14. A method according to claim 13, wherein curve-fitting the time-series of fluorescence values includes using an OBM-determination asymptotic model.

15. A method according to claim 1, wherein producing an OBM-contamination value includes solving the equation fluorescence ratio $(t)=r_1+r_2 t^{-x}$, wherein t is time, $r_1$ and $r_2$ are constants, exponent x is a decay value, and constants $r_1$ and $r_2$ are determined by fitting a time-series of fluorescence values obtained in a second period of time to the equation.

16. A method according to claim 15, wherein x is within the range 0.2 to 0.8, and is approximately $5/12$.

17. A method according to claim 15, further comprising validating single-phase flow.

18. A method according to claim 1, wherein producing an OBM-contamination value includes solving the equation fluorescence intensity $(t)=n_1+n_2 t^{-x}$, wherein t is time, $n_1$ and $n_2$ are constants, exponent x is a decay value, and constants $n_1$ and $n_2$ are determined by fitting a time-series of fluorescence values obtained in a second period of time to the equation.

19. A method according to claim 1, wherein producing an OBM-contamination value includes solving the equation fluorescence lifetime $(t)=q_1+q_2 t^{-x}$, wherein t is time, $q_1$ and $q_2$ are constants, exponent x is a decay value, and constants $q_1$ and $q_2$ are determined by fitting a time-series of fluorescence values obtained in a second period of time to the equation.

20. A method according to claim 1, wherein setting pressure in the cell at a transition boundary includes adjusting drawdown pressure.

21. A method according to claim 1, wherein determining the value of phase transition pressure includes extrapolating a representation of apparent phase transition pressure values versus OBM-contamination values.

22. A method for detecting a phase transition in a flow of retrograde condensate downhole, comprising:
    a) moving formation fluid through a phase-segregator and through a downhole cell;
    b) illuminating fluid in the cell with fluorescence excitation light to produce a time-series of fluorescence values by measuring fluorescence at intervals of time;
    c) comparing a change in fluorescence value with a predetermined value; and
    f) recognizing a phase transition when at least one change in fluorescence value is greater than the predetermined value.

23. A method for establishing single-phase flow of retrograde condensate downhole, comprising:
    a) moving formation fluid through a phase-segregator and through a downhole cell;
    b) illuminating fluid in the cell with fluorescence excitation light;
    c) decreasing drawdown pressure;
    d) producing a time-series of fluorescence values by measuring fluorescence at intervals of time;
    e) testing after each measurement for a phase transition;
    f) repeating steps c)–e) until a time-series of fluorescence values indicates no phase transition.

24. A method according to claim 23, wherein testing for a phase transition includes testing for a change in fluorescence greater than a predetermined value.

25. A method for validating single-phase flow of retrograde condensate downhole, and fluorescence measurements on said flow, during a period of time corresponding to a time-series of fluorescence measurements, comprising:
    a) moving formation fluid through a phase-segregator and through a downhole cell;
    b) illuminating fluid in the cell with fluorescence excitation light to produce a time-series of fluorescence values by measuring fluorescence at intervals of time;
    c) testing after each measurement for a phase transition; and
    f) validating single-phase flow and fluorescence measurements if every test indicates no phase transition.

26. A method according to claim 25, wherein testing for a phase transition includes testing for a change in fluorescence greater than a predetermined value.

27. A method for establishing multi-phase flow of retrograde condensate downhole, comprising:
    a) moving formation fluid through a phase-segregator and through a downhole cell;
    b) illuminating fluid in the cell with fluorescence excitation light;
    c) increasing drawdown pressure;
    d) producing a time-series of fluorescence values by measuring fluorescence at intervals of time;
    e) testing after each measurement for a phase transition;
    f) repeating steps c)–e) until a time-series of fluorescence values indicates at least one phase transition.

28. A method according to claim 27, wherein testing for a phase transition includes testing for a change in fluorescence greater than a predetermined value.

29. A method for detecting multi-phase flow in a flow of retrograde condensate downhole, comprising:
    a) moving formation fluid through a phase-segregator and through a downhole cell;
    b) illuminating fluid in the cell with fluorescence excitation light to produce a time-series of fluorescence values by measuring fluorescence at intervals of time;
    c) comparing a change in fluorescence value with a predetermined value; and
    f) detecting multi-phase flow when at least one change in fluorescence value is greater than the predetermined value.

30. A method for setting pressure in the cell at a transition boundary in a single-phase flow of retrograde condensate downhole, comprising:
    a) producing a first time-series of fluorescence values by measuring fluorescence from a flow of OBM-contaminated formation fluid in a downhole cell;
    b) validating single-phase flow;
    c) increasing a drawdown pressure by a first defined increment;

d) producing a second time-series of fluorescence values from a single-phase flow of OBM-contaminated formation fluid;
e) testing for multi-phase flow;
f) repeating steps c)–e) until multi-phase flow is established;
g) decreasing a drawdown pressure by a second defined increment;
h) producing a third time-series of fluorescence values from a multi-phase flow of OBM-contaminated formation fluid;
i) testing for single-phase flow;
j) repeating steps g)–i) until single-phase flow is established.

31. A method according to claim 30, wherein said second defined increment is smaller than said first defined increment.

32. A method for setting pressure in the cell at a transition boundary in a multi-phase flow of retrograde condensate downhole, comprising:
a) producing a first time-series of fluorescence values by measuring fluorescence from a flow of OBM-contaminated formation fluid in a downhole cell;
b) validating multi-phase flow;
c) decreasing a drawdown pressure by a first defined increment;
d) producing a second time-series of fluorescence values from a multi-phase flow of OBM-contaminated formation fluid;
e) testing for single-phase flow;
f) repeating steps c)–e) until single-phase flow is established;
g) increasing a drawdown pressure by a second defined increment;
h) producing a third time-series of fluorescence values from a single-phase flow of OBM-contaminated formation fluid;
i) testing for multi-phase flow;
j) repeating steps g)–i) until multi-phase flow is established.

33. A method according to claim 32, wherein said second defined increment is smaller than said first defined increment.

34. A method for determining phase transition pressure of downhole retrograde condensate, the method comprising:
a) producing an OBM-contamination value associated with a cycle of time from a time-series of fluorescence values measured on single-phase flow of OBM-contaminated formation fluid in a cell during the cycle of time;
b) producing an apparent phase transition pressure value associated with the cycle of time, after setting pressure in the cell at a transition boundary in the cycle of time;
c) repeating a) and b) to produce OBM-contamination values and apparent phase transition pressure values for several cycles of time; and
d) determining the value of phase transition pressure by extrapolating a representation of apparent phase transition pressure values versus OBM-contamination values.

* * * * *